United States Patent [19]
Eickhorst et al.

[11] Patent Number: 5,395,098
[45] Date of Patent: Mar. 7, 1995

[54] APPARATUS FOR HOLDING A LARGE SURFACE AREA THIN WORK PIECE WHEN SHAPING THE WORK PIECE

[75] Inventors: Helmut Eickhorst; Enno Wilken, both of Varel, Germany

[73] Assignee: Deutsche Aerospace Airbus GmbH, Hamburg, Germany

[21] Appl. No.: 52,501

[22] Filed: Apr. 26, 1993

[30] Foreign Application Priority Data

Apr. 24, 1992 [DE] Germany ............. 42 13 492.7

[51] Int. Cl.⁶ .................................................. B25B 11/00
[52] U.S. Cl. ........................................ 269/21; 269/75
[58] Field of Search ................ 248/181; 294/64.1, 65; 269/75, 21, 20, 266, 258, 264

[56] References Cited

U.S. PATENT DOCUMENTS

| | | | |
|---|---|---|---|
| 4,934,671 | 6/1990 | Laninga et al. | 269/75 |
| 4,986,503 | 1/1991 | Kabat | 248/181 |
| 5,072,907 | 12/1991 | Vogt | 248/181 |

FOREIGN PATENT DOCUMENTS

| | | |
|---|---|---|
| 0490746 | 6/1992 | European Pat. Off. |
| 3126720 | 1/1983 | Germany |
| 4017983 | 12/1991 | Germany |

Primary Examiner—Robert C. Watson
Attorney, Agent, or Firm—W. G. Fasse; W. F. Fasse

[57] ABSTRACT

A large surface area work piece, such as a piece of sheet metal to be three-dimensionally deformed is held by a suction cup member which in turn is pivotally supported by a bearing disk and by a support that holds the bearing disk as a pivot socket. Two cooperating slide bearing surfaces are formed between the support and the bearing disk and two further cooperating slide bearing surfaces are formed between the bearing disk and the suction cup member. As a result, the angular adjustment movement of the suction cup member is substantially increased with the aid of the bearing disk. In operation, the applied suction or reduced pressure holds the components and the work piece in place. Venting or a slight excess pressure is applied to release the work piece. A flexible loop holds the three components together when suction is not applied.

12 Claims, 2 Drawing Sheets

APPARATUS FOR HOLDING A LARGE SURFACE AREA THIN WORK PIECE WHEN SHAPING THE WORK PIECE

FIELD OF THE INVENTION

The invention relates to an apparatus which holds a large surface area thin work piece, such as a piece of sheet metal for shaping the work piece into a three-dimensionally curved piece of planking, for example for an aircraft body. The holding is accomplished by position adjustable suction cups.

BACKGROUND INFORMATION

The shaping of curved sheet metal components, especially spherically or three-dimensionally curved sheet metal components, such as planking elements for aircraft, requires that the support points for the sheet metal pieces are exactly positioned during the molding or shaping. By "exactly positioned" in this context is meant that the support points must be located along a three-dimensional configuration that conforms exactly to the intended configuration of the work pieces in order to avoid local deformations that do not conform to the intended configuration of the work piece in a three-dimensional coordinate system.

German Patent Publication (DE) 3,126,720 C2 discloses clamping elements which hold a work piece by applying reduced pressure or suction to the clamping element. Such conventional clamping elements comprise a support that is vertically adjustable. The support holds a suction cup element in a hemispherical shell or cavity of the support in a pivotable manner. Thus, a suction cup plane can be adjusted to different angles relative to a horizontal plane. The support is equipped with connection nipples for the supply, either of pressurized air, or to a suction generator for producing reduced pressure in the suction cup.

The conventional holding or clamping device is limited in the angular adjustability of the position of the suction cups so that it is difficult to hold work pieces of a complicated, three-dimensionally curved configuration.

OBJECTS OF THE INVENTION

In view of the foregoing it is the aim of the invention to achieve the following objects singly or in combination:
- to improve a clamping device of the type described above in such a manner that three-dimensionally curved work pieces, especially spherically curved work pieces can be effectively held in place for their intended deformation independently of the fact how complicated the curvature of the work piece may be;
- to provide a clamping mechanism with a suction cup member which can be adjusted through a substantial angular range, for example, up to 50° clockwise and counterclockwise from a central axis so that the total adjustment range is 100°; and
- to hold the components of the clamping or holding mechanism relative to each other by suction when these components are in their operating work piece holding position.

SUMMARY OF THE INVENTION

The present clamping mechanism according to the invention is characterized in that a bearing disk, preferably a spherically curved bearing disk, is arranged between a support and a suction cup member, whereby the bearing disk is adjustable relative to the support and the suction cup member is adjustable relative to the bearing disk and/or relative to the support. For this purpose, two pairs of cooperating bearing surfaces are provided. One pair is located between the support and the bearing disk while the other pair is provided between the bearing disk and the suction cup member. This combination of the above components has the advantage that the suction cup member itself that holds the work piece, can be adjusted in its position through a substantially increased angular range compared to conventional devices, said angular range being measured relative to a horizontal plane or vertical axis. It is now possible to shape three-dimensional work pieces even if these work pieces have a complicated three-dimensional curvature or spherical curvature, whereby in both instances even vaults with a small curvature or radius can be efficiently held and clamped for their intended deformation.

More specifically, the bearing disk is adjustable on a guide surface of the support, and the suction cup member is adjustable on a guide surface of the bearing disk. The bearing disk functions as a pivot member that extends the available pivot range, whereby the suction cup member can be adjusted through an optimally large range. The guide surfaces or cooperating surface pairs are forming part of spherical segments, preferably ring segments so that the pivoting adjustment motion of the suction cup member can take place in all directions in a stepless manner.

The support and the pivoting bearing disk each have an inner circular ring-shaped bearing or guide surface surrounding a recess in the support and in the bearing disk respectively. Each recess is positioned centrally and surrounded by a ring wall forming a respective limit stop. The bearing disk and the suction cup member are each provided with a centrally positioned projection that cooperates with the respective ring wall when a limit stop has been reached in an adjustment movement. Preferably, the inner guide surfaces of the support and of the bearing disk are concave while the outer bearing or guide surfaces of the bearing disk and of the suction cup member are convex. However, the oppositely directed surface paring is also possible whereby the suction cup member has a concave outer surface, and the support would have a convex outer surface with respective pairing surfaces on the bearing disk.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
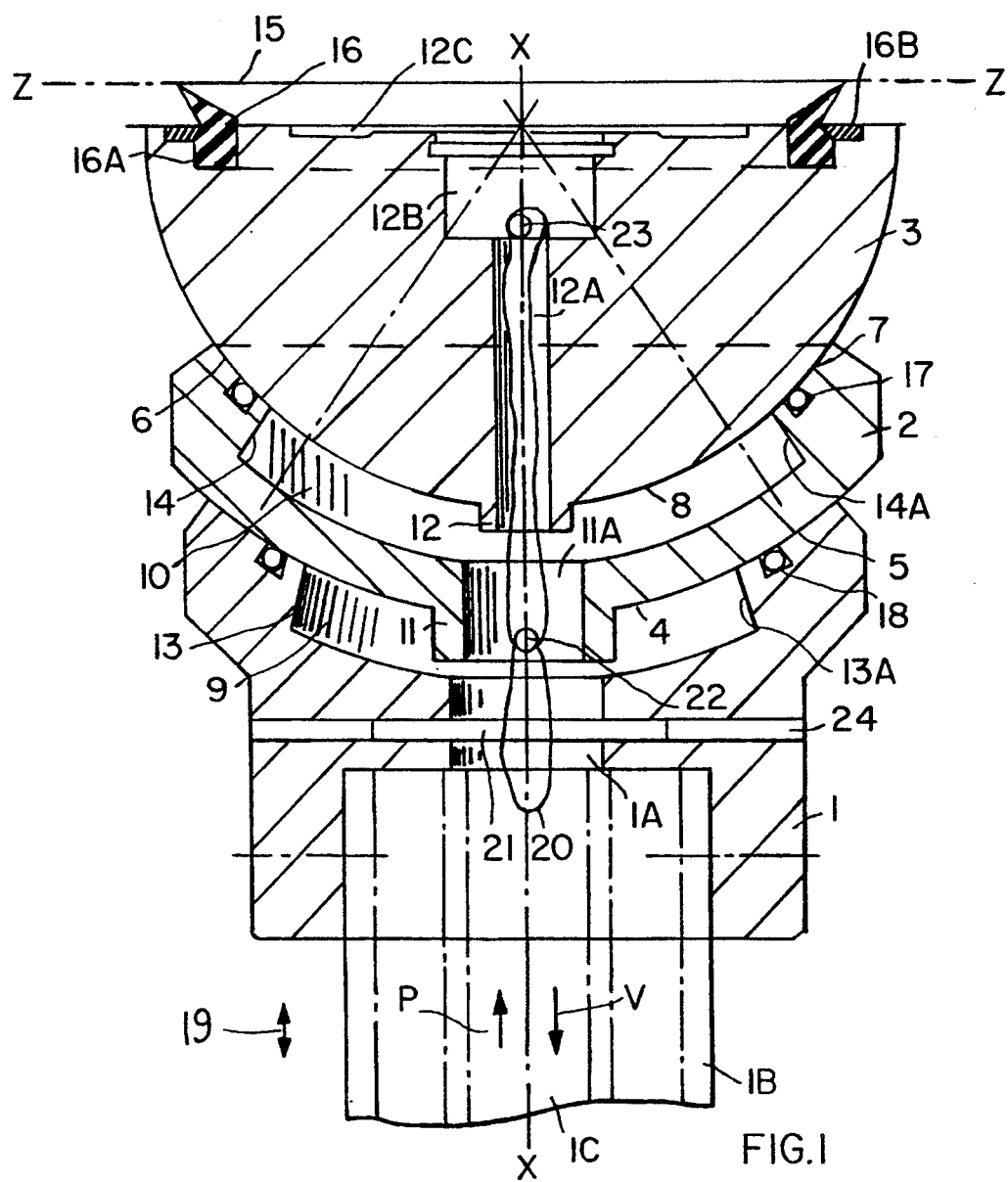
FIG. 1 is a sectional view through a clamping mechanism according to the invention, with a pivoting bearing disk between a support and a suction cup member, whereby all three elements are aligned relative to a common central vertical axis.
Figure 2:
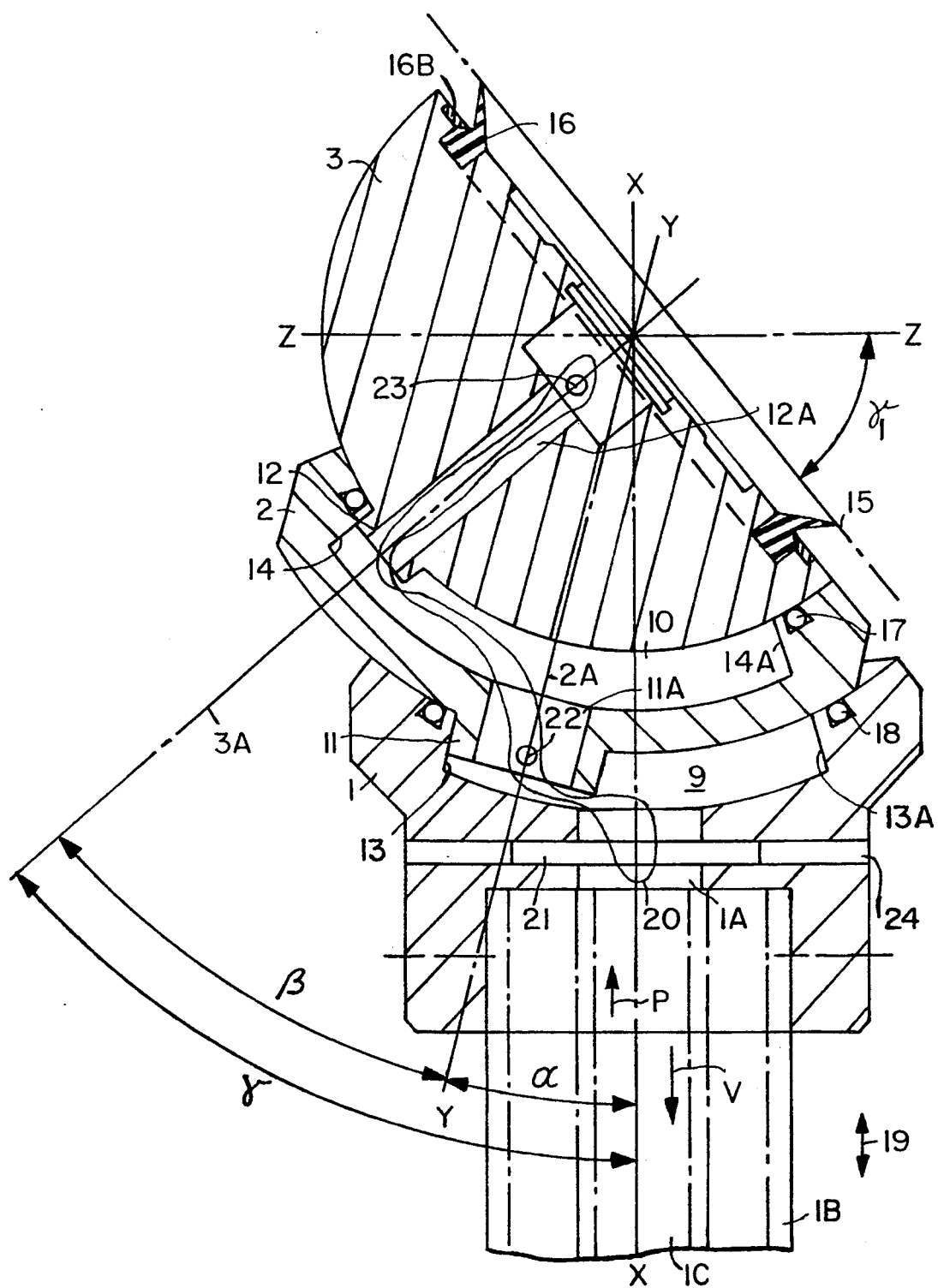
FIG. 2 is a view similar to that of FIG. 1, but illustrating a maximum clockwise pivoting of the bearing disk and of the suction cup member.

Referring to FIGS. 1 and 2, the present clamping mechanism comprises a support 1 having a central bore 1A forming an air flow path. The support 1 is mounted on a carrier or mounting 1B which is, for example threaded into a threaded socket of the support 1. The carrier is vertically adjustable up and down as indicated by the arrow 19 by a conventional adjustment drive, such as a piston cylinder device, for example. A suction cup member 3 is supported on the support 1 by an intermediate pivoting bearing disk 2 also provided with a central bore 11A forming part of the air flow path that continues through a bore 12A, a cavity 12B, and an air distribution flat recess 12C in the suction cup member 3.

The bearing disk 2 has an outer surface 4 formed as a spherical segment surface, preferably a convex spherical ring surface, resting in a pivoting contact on a concave spherical ring surface 5 forming part of the support 1. Opposite the convex outer surface 4 of the bearing disk 2, the latter is provided with a concave bearing surface 7 cooperating with a spherical segment convex surface 8 of the suction cup member 3. Thus, two pairs of cooperating sliding and guide surfaces are formed, namely the concave surface 5 of the support 1 pairs up with the convex surface 4 of the bearing disk 2, and the concave bearing surface 7 of the disk 2 pairs up with the convex surface 8 of the member 3. The surfaces 4 and 8 form substantially larger spherical ring segments of a convex configuration, while the surfaces 5 and 7 form smaller concave spherical ring surfaces. The ring surfaces 5 and 7 form rims for the support 1 and the bearing disk 2 respectively. The rim with the surface 5 surrounds a central recess 9 in the support 1. A substantially vertically extending rim surface 13 forms a stop 13A around the recess 9. Similarly, a circular recess 10 is formed in the bearing disk 2, whereby the rim with the surface 7 surrounds the recess 10 with a wall 14 forming limit stops 14A.

The limit stop 13A cooperates with a central projection 11 facing downwardly and secured to or forming an integral part of the disk 2, whereby an angular pivoting limit is provided for the disk 2 as will be described in more detail below with reference to FIG. 2. Similarly, the suction cup member 3 is provided with a central projection 12 that reaches into the recess 10 of the disk 2 and is stopped in its angular pivoting movement by the limit stop 14A.

Referring further to FIG. 1, a suction cup 16 is carried in a groove 16A in the upwardly facing circular surface of the suction cup member 3. The suction cup 16 is held in place in the groove 16A by a clamping ring 16B that permits the easy exchange of the suction cup 16 that forms a surface 15 for holding a work piece. A horizontal plane Z—Z is defined by the ring surface 15 of the suction cup 16. Further, a seal 17 is provided between the cooperating surfaces 7 and 8. Similarly, a seal 18 is provided between the cooperating surfaces 4 and 5. These seals make it possible to establish reduced pressure within the suction cup 16 through passages 1A in the support 1, 11A in the projection 11 of the disk 2, and 12A passing through the projection 12 and the body of the member 3 to a cavity 12B leading into the space surrounded by the rim of the suction cup 16. A flat recess 12C in the circular surface of the suction cup member 3 communicates the cavity 12B with the space surrounded by the suction cup 16, thereby facilitating the distribution of suction air coming through the just described flow path and indicated by the arrow V shown in FIGS. 1 and 2. Similarly, compressed air indicated by the arrow P in FIGS. 1 and 2 can pass through the just mentioned passage 1A, 11A, 12A, 12B, 12C to release a piece of sheet metal from the suction cup 16.

Referring to FIG. 2, the limiting of the pivoting movements of the bearing disk 2 relative to the support 1 and of the suction cup member 3 relative to the bearing disk 2 will now be described. The just mentioned elements are so dimensioned that the disk 2 can pivot in all direction clockwise or counterclockwise from a central axis X—X by an angle $\alpha$, namely until the projection 11 contacts the limit stop 13A formed by the wall 13 surrounding the recess 9 in the support 1. The angle $\alpha$ is measured between the central vertical axis X—X and the central axis 2A of the bearing disk 2. For example, the angle $\alpha$ amounts to 15°. Similarly, the suction cup member 3 can tilt in the recess 10 of the disk 2 until the projection 12 contacts the limit stop 14A formed by the wall 14 around the recess 10. The angle between the central rotational axis 3A of the suction cup member 3 and the central axis 2A of the disk 2 is $\beta$ and that angle may, for example, be 35° so that the total tilting angle $\gamma$ amounts to $\alpha+\beta$ which is 50° in the example. As a result, the plane 15 defined by the suction cup 16 also tilts by an angle $\gamma_1$ of 50° relative to the horizontal plane Z—Z. Thus, with the aid of the intermediate bearing disk 2, the tilting range has been substantially increased for the suction cup member 3.

In order to hold a sheet metal piece by the suction cup 16 in the plane 15, reduced pressure is applied through the above mentioned passages 1A, 11A, . . . . For this purpose the mounting 1B is provided with a central bore 1C communicating with the just mentioned passages. The bore 1C is connected through a valve, not shown, to the suction port of a compressor or to the pressure port of a compressor. When the bore 1C is connected to suction, the reduced pressure generated in the recesses 9 and 10 is sufficient to hold the elements 1, 2, and 3 together and to also tightly hold a work piece by the suction cup 16. The reduced pressure indicated by the arrow V is maintained until the work piece may be released after shaping is completed.

Release of the work piece is accomplished by venting as indicated by the arrow P. If necessary, a slight pressure may be applied for the release of the work piece. In order to prevent a dislocation of the elements 1, 2, and 3 relative to each other in an undesirable manner, these elements are held together by a flexible loop 20 passing around three cross pins 21, 22, and 23. The cross pin 21 extends through a bore 24 in the support 1. The cross pin 22 extends through the projection 11 of the bearing disk 2. The cross pin 23 extends through the central axis of the suction cup member 3 in the cavity 12B. The loop 20 is sufficiently flexible and elastic to follow the angular movements of the elements 2 and 3 as best seen in FIG. 2. The insertion of the loop is accomplished when the elements 1, 2, and 3 are in the position of FIG. 1, whereby the loop is passed through the passages 1A, 11A, 12A, whereupon the cross pins 21, 22, and 23 are inserted. Once the elements 1, 2, and 3 are in the proper angular position relative to each other, for example as shown in FIG. 2, the venting is removed and reduced pressure V is applied to clamp the elements and the work piece into the desired position.

Although the invention has been described with reference to specific example embodiments, it will be appreciated that it is intended to cover all modifications and equivalents within the scope of the appended claims.

What we claim is:

1. An apparatus for holding a large surface area thin work piece by suction for shaping said work piece, comprising a support (1), a bearing disk (2), and a suction cup member (3) for holding said work piece by suction, a first pair of cooperating sliding bearing surfaces (4, 5) between said support (1) and said bearing disk (2) for permitting relative movement between said support and said bearing disk, a second pair of cooperating sliding bearing surfaces (7, 8) between said bearing disk (2) and suction cup member (3), whereby said bearing disk and said suction cup member are position adjustable relative to each other and relative to said support for positioning said suction cup member (3) in a work piece holding position, said support (1) having a first central recess (9) with a first stop wall (13) surrounded by said sliding bearing surface (5) of said support (1), said bearing disk (2) having a first central projection (11) reaching into said first central recess (9) for limiting relative movement between said support (1) and said bearing disk (2) when said first central projection (11) contacts said first stop wall (13), said bearing disk (2) having a second central recess (10) with a second stop wall (14) surrounded by said sliding bearing surface (7) of said bearing disk (2), said suction cup member (3) having a second central projection (12) reaching into said second central recess (10) for limiting relative movement between said bearing disk (2) and said suction cup member (3) when said second central projection (12) contacts said second stop wall (14).

2. The apparatus of claim 1, further comprising a flexible member (20) connected to said support (1), to said bearing disk (2), and to said suction cup member (3) for holding said support (1), said bearing disk (2), and said suction cup member (3) together.

3. The apparatus of claim 1, wherein each of said first pair (4, 5) and said second pair (7, 8) of cooperating sliding bearing surfaces comprises a concave surface and a convex surface cooperating with each other so that a position adjustment movement is an angular movement.

4. The apparatus of claim 3, wherein said concave surface (5, 7) and said convex surface (4, 8) are segments of spherical surfaces.

5. The apparatus of claim 4, wherein said spherical surface segments of concave surfaces are concave spherical ring surfaces (5, 7), and wherein said segments of convex surfaces are convex spherical ring surfaces (4, 8) slidingly resting on said concave spherical ring surfaces (5, 7), said convex spherical ring surfaces (4, 8) being substantially larger than said concave spherical ring surfaces (5, 7) for permitting said position adjustable movement.

6. The apparatus of claim 1, wherein said first stop wall is a first ring wall (13) in said support (1) and wherein said second stop wall is a second ring wall in said bearing disk (2).

7. The apparatus of claim 3, wherein a range of said angular movement of said bearing disk (2) relative to said support (1) is 15° ($\alpha$) clockwise and counterclockwise from a central axis (x—x) of said support.

8. The apparatus of claim 3, wherein a range of said angular movement of said suction cup member (3) relative to said bearing disk (2) is 35° ($\beta$) clockwise and counterclockwise from a central axis (y—y) of said suction cup member.

9. The apparatus of claim 3, wherein a total range of said angular movement of said bearing disk (2) and of said suction cup member (3) relative to said support (1) is 50° clockwise and counterclockwise from a central axis (x—x) of said support, whereby a work piece holding plane (15) of said suction cup member (3) is adjustable through an angular range of 50° ($\gamma_1$) relative to a horizontal plane (z—z).

10. The apparatus of claim 2, further comprising at least one cross-pin (21, 22, 23) for securing said flexible member (2) to said support (1), to said bearing disk (2), and to said suction cup member (3).

11. The apparatus of claim 10, further comprising flow ducts passing through said support (1), through said bearing disk (2), and through said suction cup member (3) for holding said work piece by suction and for releasing said work piece by venting or a slight pressure, said cross-pins extending in said flow ducts, said flexible member (20) comprising a flexible, elastic loop connected to each of said cross-pins, and wherein said flexible, elastic loop passes through said flow ducts.

12. The apparatus of claim 1, further comprising a first sealing ring (18) between said first sliding bearing surfaces (4, 5) and a second sealing ring (17) between said second sliding bearing surfaces (7, 8).

* * * * *